US008900092B2

(12) United States Patent
Weist

(10) Patent No.: US 8,900,092 B2
(45) Date of Patent: Dec. 2, 2014

(54) PLANETARY GEAR MECHANISM

(71) Applicant: Robert Bosch GmbH, Stuttgart (DE)

(72) Inventor: Dietmar Weist, Dortmund (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/926,626

(22) Filed: Jun. 25, 2013

(65) Prior Publication Data

US 2014/0004992 A1  Jan. 2, 2014

(30) Foreign Application Priority Data

Jun. 28, 2012  (DE) .......................... 10 2012 012 900

(51) Int. Cl.
*F16H 57/08* (2006.01)
*F16C 33/58* (2006.01)
*F16H 1/28* (2006.01)
*F03D 11/02* (2006.01)

(52) U.S. Cl.
CPC .................. *F16H 1/28* (2013.01); *F16H 57/08* (2013.01); *Y02E 10/728* (2013.01); *F16H 2057/085* (2013.01); *Y02E 10/722* (2013.01); *F03D 11/02* (2013.01)
USPC .......................................... 475/348; 384/571

(58) Field of Classification Search
CPC ..... F16H 1/28; F16H 57/08; F16H 2057/085; F16C 19/548; F16C 35/061; F16C 35/067; F03D 11/02; Y02E 10/728; Y02E 10/722
USPC ................................. 475/348, 331
See application file for complete search history.

(56) References Cited

U.S. PATENT DOCUMENTS 3,326,613 A * 6/1967 Hansjorg ...................... 384/493
4,061,377 A * 12/1977 Nordstrom ................... 384/584
4,838,841 A * 6/1989 Harvey ......................... 474/190
6,971,802 B2 * 12/2005 Vezina ......................... 384/517
8,474,589 B2 * 7/2013 Clapp ........................ 192/85.49
8,764,305 B2 * 7/2014 Henneberger ............... 384/551
2006/0293142 A1  12/2006 Torres et al.

FOREIGN PATENT DOCUMENTS

| CN | 201747802 U | 2/2011 |
| CN | 202140547 U | 2/2012 |
| CN | 202251891 U | 5/2012 |
| DE | 201 08 305 U1 | 10/2001 |
| DE | 10 2006 051 817 A1 | 5/2008 |
| EP | 1 252 442 B1 | 10/2002 |
| EP | 1 837 535 A1 | 9/2007 |
| JP | 62-18455 U | 2/1987 |
| JP | 7-317884 A | 12/1995 |
| JP | 2006-349046 A | 12/2006 |

* cited by examiner

*Primary Examiner* — Dirk Wright

(74) *Attorney, Agent, or Firm* — Maginot, Moore & Beck LLP

(57) ABSTRACT

A planetary gear mechanism converts rotational movement of a drive shaft into rotational movement of an output shaft. The mechanism includes a planetary gear carrier, a planetary gear, and a bearing arrangement. The bearing arrangement includes roller bearings spaced apart between the planetary gear and planetary gear carrier. Each roller bearing has an inner ring and outer ring. The bearing arrangement includes a ring to position the roller bearings on the planetary gear carrier and a collar to secure the planetary gear. The ring is on an outer face of the planetary gear carrier between the inner rings. The collar is on an inner face of the planetary gear between the outer rings. An intermediate ring on the inner face of the planetary gear positions the roller bearings. The intermediate ring has a cutout directed to the collar which corresponds to an axial length of the collar.

10 Claims, 2 Drawing Sheets

PLANETARY GEAR MECHANISM

This application claims priority under 35 U.S.C. §119 to patent application no. DE 10 2012 012 900.9, filed on Jun. 28, 2012 in Germany, the disclosure of which is incorporated herein by reference in its entirety.

BACKGROUND

The present disclosure relates to a planetary gear mechanism for converting a slow rotational movement of a drive shaft into a rapid rotational movement of an output shaft, the planetary gear mechanism having, on a planetary gear carrier, a bearing arrangement for rotatably mounting a planetary gear, comprising at least two tapered roller bearings which are arranged spaced apart axially from one another between the planetary gear and the planetary gear carrier, the at least two tapered roller bearings in each case having an inner ring and an outer ring, and an intermediate ring for axially positioning the at least two tapered roller bearings on the planetary gear carrier being arranged on an outer circumferential face of the planetary gear carrier between the two inner rings, a collar for axially securing the planetary gear being formed, furthermore, on an inner circumferential face of the planetary gear between the two outer rings radially along the inner circumference of the planetary gear.

The field of application of the disclosure extends to planetary gear mechanisms as are present in the drive train of a wind power plant having a power output of at least 1 MW. Important features of planetary gear mechanisms of this type are, inter alia, the dimensions and the weight. In the configuration of the gear mechanism parts, in addition to the material selection and the structural aspects, the prevailing forces and torques which act on the planetary gear mechanism are also important. Planetary gear mechanisms of this type are subject to extraordinary loadings which are caused on account of the structural position and the non-uniformly changing collective loading.

A bearing arrangement for the rotatable mounting of a planetary gear on a planetary carrier is apparent from DE 10 2006 051 817 A1, having two tapered roller bearings which are arranged at an axial spacing from one another, at least one radial bearing being arranged between the tapered roller bearings, in order to increase the load-bearing capability of the bearing arrangement. The radial bearing which is arranged between the tapered roller bearings can be adjusted with regard to the bearing play and/or the bearing prestress, in order to distribute the load-bearing capability of the bearing arrangement uniformly. Furthermore, a radially inwardly pointing annular web is formed on the planetary gear, the radially inwardly pointing circumferential face of which annular web is supported on the radially outer circumferential face of the outer ring of the radial bearing. Further specifications or solutions to problems of the inwardly pointing annular web are not apparent from the document.

Furthermore, a planetary gear which is mounted rotatably on a planetary carrier of a planetary gear mechanism is apparent from EP 1 837 535 A1, the mounting having two tapered roller bearings which are situated at an axial spacing from one another and are positioned in an X-arrangement. A spacer ring is arranged between an inner ring of one tapered roller bearing and an inner ring of the other tapered roller bearing, which spacer ring is segmented in the circumferential direction and is a constituent part of a group of various spacer rings with different graded widths. The prestress in two-row tapered roller bearings is defined by the spacer ring, the width of which as a result is adapted precisely to the required conditions and to the desired bearing play and/or the desired bearing prestress.

Moreover, a gear mechanism unit for a wind turbine arrangement is apparent from EP 1 252 442 B1. Said gear mechanism unit comprises a planetary gear stage, in which a planetary gear is mounted rotatably on a planetary gear carrier by two bearings, the bearings being spaced apart axially with regard to the rotational axis of the planetary gear. The bearings are conical bearings which come into contact in a surface region of the planetary gear. A central, integrated planetary gear section which extends radially inward between the bearings which are spaced apart axially can be seen from FIG. 2b.

It is apparent from the generally known prior art that securing rings can be used for securing a planetary gear axially. The disadvantage of said known solution is that securing rings are subject to axial wear. Furthermore, torques in the MN range act in planetary gear mechanisms for wind power plants, with the result that the structural selection of securing rings can be associated with further risks. In order to eliminate the problem of the wear-susceptible securing rings, solutions are known, furthermore, in which a wear-resistant collar is provided for axially securing the planetary gear, which collar bears on the end side against both bearings. The disadvantage of said known solution is that the bearing play of the tapered roller bearing can be adjusted only in a very complicated manner by material-removing processes or grinding processes.

SUMMARY

It is therefore the object of the present disclosure to provide a wind power plant, in particular a planetary gear mechanism of a wind power plant, which is optimized with regard to the adjusting of the bearing play and maintenance. Furthermore, the assembly and prestress of the bearings is to be possible in a simple way.

The object is achieved proceeding from a wind power plant in accordance with the description below in conjunction with its characterizing features. Advantageous developments of the disclosure are apparent from the following description.

According to the disclosure, at least one intermediate ring for axially positioning the at least two tapered roller bearings with respect to one another is arranged on the inner circumferential face of the planetary gear, which intermediate ring has, on an outer circumferential face, a cutout which is directed to the collar and corresponds at least to the axial length of the collar. At least two planetary gears of the planetary gear mechanism preferably have a spur toothing system or a helical toothing system.

The collar extends radially over the inner circumference of the planetary gear and advantageously has rounded corners and undercuts in order to reduce the stress concentration. By virtue of the fact that the collar is a part of the planetary gear and the intermediate ring bears against it, the collar acts like a solid, wear-resistant securing ring. It is therefore possible to procure the at least one tapered roller bearing pair with a preset bearing play, and complicated adjusting of the bearing play with the planetary gear is dispensed with. Furthermore, the prestress of the at least two tapered roller bearings can be adjusted via the intermediate ring on the planetary gear carrier and the intermediate ring on the planetary gear.

According to one preferred embodiment, the collar comes into contact with an axially inwardly directed end face of one of the outer rings. As a result of an arrangement of this type, the collar assumes the task of the securing ring, but exceeds the latter in terms of operational security and load-bearing capability. In order to make the pre-setting of the bearing play possible, the collar should not fill the entire intermediate space between the two outer rings of the tapered roller bearings, but rather should be of relatively narrow configuration in comparison with the intermediate ring. The collar is advantageously at most half as wide as the intermediate ring.

According to a second preferred embodiment, the collar is formed substantially centrally between the two outer rings, in each case one intermediate ring being arranged on the two axial end faces of the collar. The two intermediate rings come into contact on their axial end faces. This embodiment permits a central arrangement of the collar, but requires two intermediate rings which are operatively connected to one another and to the collar. The two intermediate rings should in each case have a cutout, with the result that the collar fits like a tooth into this gap.

Furthermore, it is provided that the at least two tapered roller bearings have an O-arrangement of the antifriction bearing elements. As a result of the O-arrangement, the spacing of the pressure cone tips from one another, what is known as the supporting base, is greater, since the lines of action run to the outside. Inter alia, the stability is increased as a result, on account of a smaller tilting play.

According to a measure which improves the disclosure further, it is proposed that the at least one intermediate ring and the planetary gear have wear-reducing surfaces. Wear-reducing surfaces can be produced by thermal treatments and/or coatings. Both the planetary gear and the intermediate ring are advantageously hardened in the context of a thermal treatment. Furthermore, a wear-reducing coating of the circumferential faces of the rim and the entire intermediate ring is conceivable.

Furthermore, a clearance fit is preferably provided between the at least one intermediate ring and the planetary gear. The clearance fit facilitates the assembly considerably and fulfils the task of positioning the tapered roller bearings axially. A play is therefore preferably provided on all circumferential faces of the collar which would come into contact with the circumferential faces of the intermediate ring.

It is proposed, furthermore, that the axial end faces of the collar and the axial end faces of the at least one intermediate ring are hard-turned and/or surface-ground. The subsequent hard-turning of the end faces permits precise adjustment of the width of the collar and of the at least one intermediate ring. Precise positioning of the at least two tapered roller bearings can therefore be realized. Furthermore, the surface-grinding of the axial end faces increases the surface quality and reduces the susceptibility for crack formation.

BRIEF DESCRIPTION OF THE DRAWINGS

Further measures which improve the disclosure will be shown in greater detail in the following text together with the description of one preferred exemplary embodiment of the disclosure using the figures, in which.

DETAILED DESCRIPTION

Figure 1:
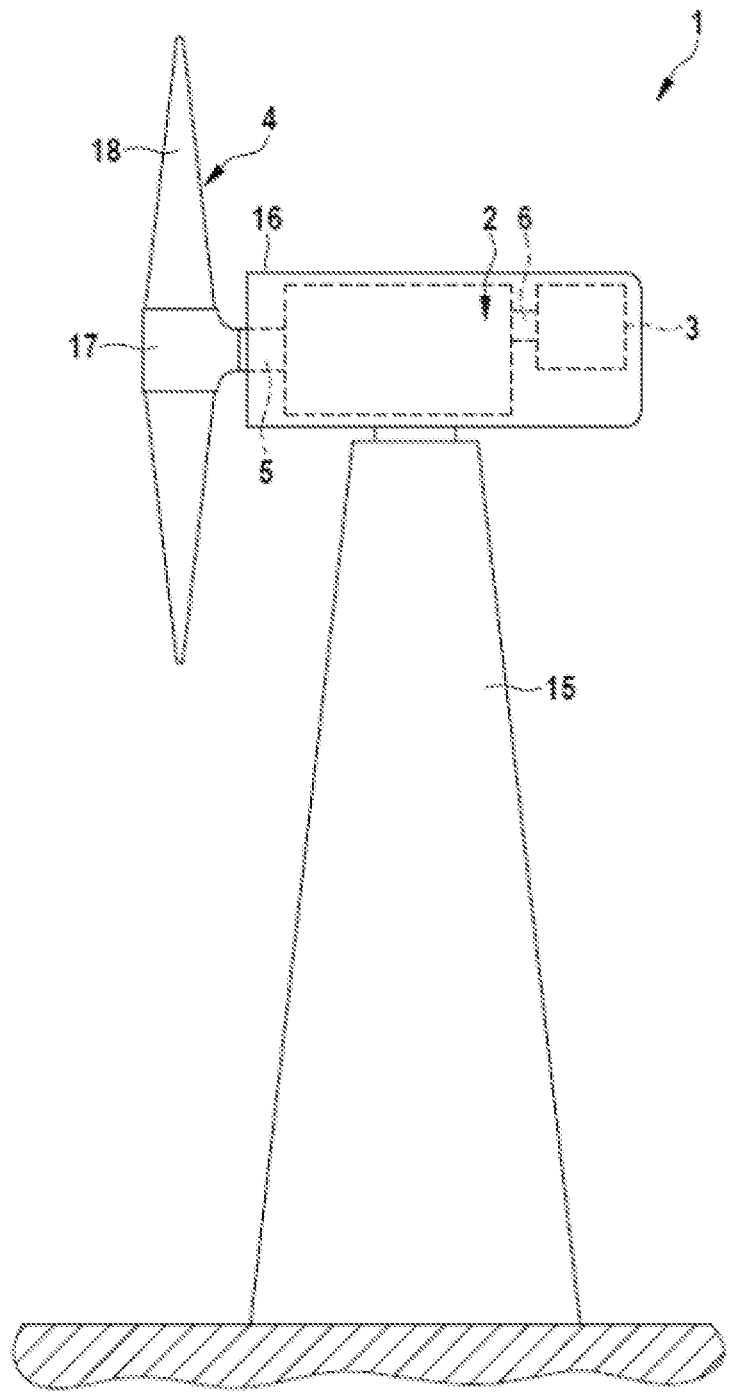
FIG. 1 shows a diagrammatic side view of a wind power plant.

FIG. 1 shows a side view of a wind power plant 1 with its essential assemblies. The wind power plant 1 has a tower 15, on which a nacelle 16 which is mounted such that it can be rotated about a vertical axis is arranged in the form of a machine housing. A planetary gear mechanism 2 is fastened in a rotationally fixed manner in the nacelle 16, the planetary gear mechanism 2 having a drive shaft 5 and an output shaft 6. The drive shaft 5 of the planetary gear mechanism 2 is connected to a hub 17 of a rotor 4 which has a plurality of rotor blades 18. The output shaft 6 is rotationally connected to a drive apparatus to be driven in the form of a generator 3.

The planetary gear mechanism 2 is configured in such a way that it converts a slow rotational movement of the drive shaft 5 into a rapid rotational movement of the output shaft 6. To this end, the planetary gear mechanism 2 has one or more planetary gear stages which interact with the output shaft 6 via a terminating spur gear mechanism. Electrical energy is generated by means of the wind power plant 1, by the rotor 4 which is set in rotational movement by the wind introducing the rotational movement on the drive shaft 5 into the planetary gear mechanism 2. The planetary gear mechanism 2 converts the rotational movement into a more rapid rotational movement and, finally, the rapid rotational movement is transmitted via the output shaft 6 to the generator 3 in order to generate electricity.

Figure 2:
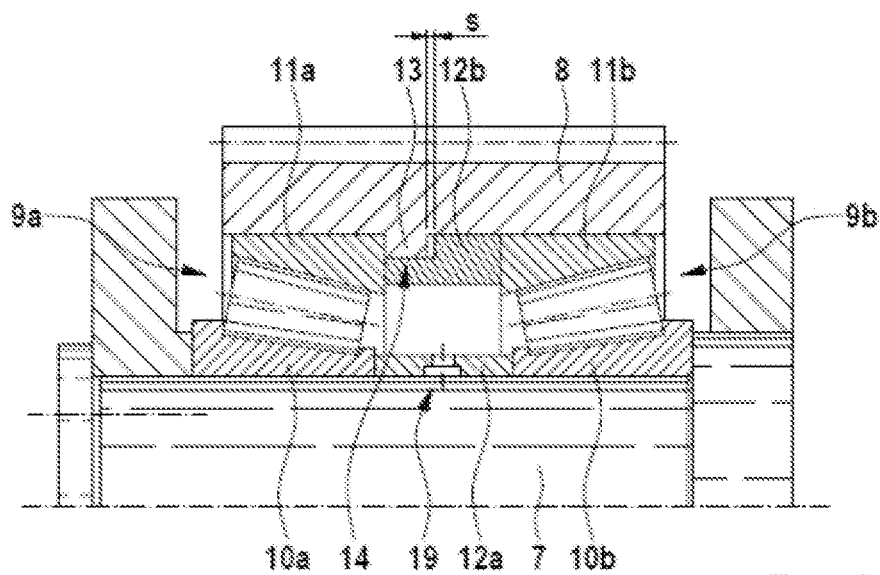
FIG. 2 shows a diagrammatic longitudinal sectional illustration of the bearing arrangement according to the disclosure including the collar on the planetary gear.

A planetary carrier 7 can be seen in FIG. 2, on which two tapered roller bearings 9a, 9b are arranged. The tapered roller bearings 9a, 9b have an O-arrangement. The outer rings 11a, 11b of the tapered roller bearings 9a, 9b come to bear against a planetary gear 8, the planetary gear 8 having a collar 13 which extends over the inner circumferential face. The collar 13 is arranged between the outer rings 11a, 11b, said collar 13 bearing against an axial end face of the outer ring 11a. An intermediate ring 12b is arranged between the two outer rings 11a, 11b, said intermediate ring 12b bearing against the axial end faces of the outer rings 11a, 11b. Furthermore, a clearance fit s is provided between the planetary gear 8 including the collar 13 and the intermediate ring 12b. An intermediate ring 12a is likewise arranged with a clearance fit between the inner rings 10a, 10b. The inner ring 12a has a hole 19, through which the lubricant can flow for lubricating and cooling the two tapered roller bearings 9a, 9b. The position of the tapered roller bearings 9a, 9b with respect to one another is determined via the two intermediate rings 12a, 12b, the collar 13 being used to secure the planetary gear 8 axially. Moreover, a prestress can be applied to the two tapered roller bearings 9a, 9b via the two intermediate rings 12a, 12b.

The axial end faces of the collar 13 and the axial end faces of the intermediate ring 12b are hard-turned and surface-ground. The surface-grinding of the axial end faces increases the surface quality and reduces the susceptibility for crack formation. In order to increase the wear resistance of the intermediate ring 12b and of the planetary gear 8, the two components are hardened. In addition, the collar 13 and the intermediate ring 12b have a wear-reducing coating. A wear-reducing coating of this type can preferably be applied by bondering.

Figure 3:
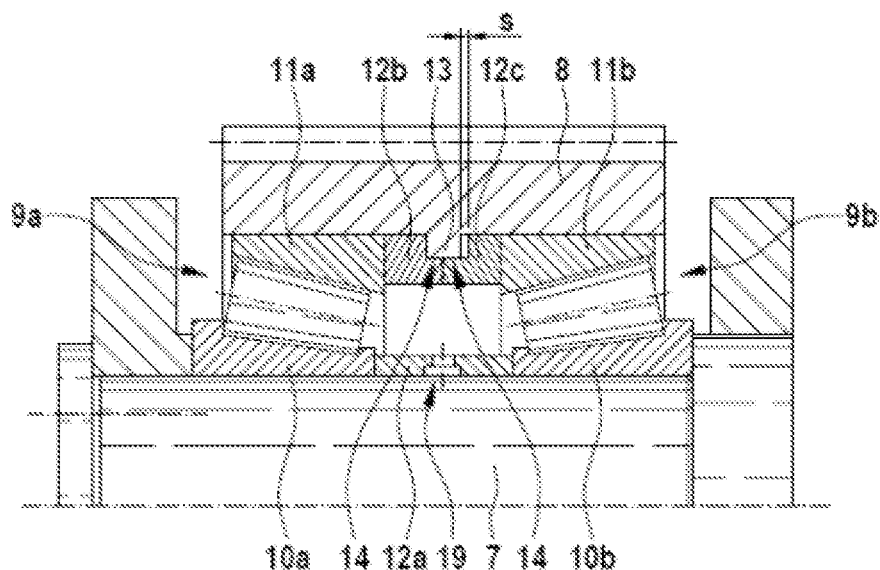
FIG. 3 shows a second embodiment of the bearing arrangement according to the disclosure including the collar on the planetary gear.

FIG. 3 shows a further embodiment, the collar 13 being formed centrally between the two outer rings 11a, 11b in this embodiment. Furthermore, in each case one intermediate ring 12b, 12c is arranged on the two axial end faces of the collar 13, the two intermediate rings 12b, 12c coming into contact on their axial end faces. Furthermore, a clearance fit s is provided between the planetary gear 8 including the collar 13 and the intermediate ring 12c.

The disclosure is not restricted to the above-described preferred exemplary embodiments. Rather, modifications thereof are also conceivable which are also included in the scope of protection of the disclosure. It is thus also possible, for example, to configure the outer rings 11a, 11b of the tapered roller bearings 9a, 9b in such a way that the intermediate ring 12b is dispensed with as an individual part, but the collar 13 is retained. To this end, one of the outer rings 11a, 11b should preferably have the geometry of the intermediate ring 12b on an axial end face, with the result that the intermediate ring 12b is integrated into one of the outer rings 11a, 11b. Furthermore, it is also conceivable that the bearing arrangement has four tapered roller bearings 9 for the rotatable mounting of the planetary gear 8.

In addition, it is to be noted that "comprising" does not preclude any other elements or steps and "one" or "a/an" does not preclude a multiplicity. Furthermore, it is to be noted that features or steps which have been described with reference to one of the above exemplary embodiments can also be used in combination with other features or steps of other above-described exemplary embodiments. Designations herein are not to be considered to be a restriction.

LIST OF DESIGNATIONS

1 Wind power plant
2 Planetary gear mechanism
3 Generator
4 Rotor
5 Drive shaft
6 Output shaft
7 Planetary gear carrier
8 Planetary gear
9a, 9b Tapered roller bearing
10a, 10b Inner ring
11a, 11b Outer ring
12a, 12b, 12c Intermediate ring
13 Collar
14 Cutout
15 Tower
16 Nacelle
17 Hub
18 Rotor blades
19 Hole
s Clearance fit

What is claimed is:

1. A planetary gear mechanism for converting a slow rotational movement of a drive shaft into a rapid rotational movement of an output shaft, the planetary gear mechanism comprising:
   a planetary gear carrier;
   a planetary gear; and
   a bearing arrangement arranged on the planetary gear carrier and configured to rotatably mount the planetary gear, the bearing arrangement including:
      at least two tapered roller bearings arranged spaced apart axially from one another between the planetary gear and the planetary gear carrier, each of the at least two tapered roller bearings having an inner ring and an outer ring;
      a first intermediate ring configured to axially position the at least two tapered roller bearings on the planetary gear carrier, the first intermediate ring arranged on an outer circumferential face of the planetary gear carrier between the two inner rings;
      a collar formed on an inner circumferential face of the planetary gear between the two outer rings radially along an inner circumference of the planetary gear, the collar configured to axially secure the planetary gear; and
      at least one second intermediate ring configured to axially position the at least two tapered roller bearings with respect to one another, the at least one second intermediate ring arranged on the inner circumferential face of the planetary gear, the at least one second intermediate ring having:
         an outer circumferential face; and
         a cutout formed on the outer circumferential face and directed to the collar, the cutout configured to correspond at least to an axial length of the collar.

2. The planetary gear mechanism according to claim 1, wherein the collar is configured to come into contact with an axially inwardly directed end face of one of the outer rings.

3. The planetary gear mechanism according to claim 1, wherein:
   the collar has two axial end faces,
   the collar is formed substantially centrally between the two outer rings,
   the at least one second intermediate ring includes two second intermediate rings, and
   one of the two second intermediate rings is arranged on each of the two axial end faces of the collar.

4. The planetary gear mechanism according to claim 3, wherein the two second intermediate rings are configured to come into contact on axial end faces.

5. The planetary gear mechanism according to claim 1, wherein the at least two tapered roller bearings have an O-arrangement of antifriction bearing elements.

6. The planetary gear mechanism according to claim 1, wherein the at least one second intermediate ring and the planetary gear have wear-reducing surfaces.

7. The planetary gear mechanism according to claim 1, further comprising a clearance fit provided between the at least one second intermediate ring and the planetary gear.

8. The planetary gear mechanism according to claim 1, wherein:
   the collar has axial end faces,
   the at least one second intermediate ring has axial end faces, and
   the axial end faces of the collar and the axial end faces of the at least one second intermediate ring are hard-turned and/or surface-ground.

9. The planetary gear mechanism according to claim 1, wherein at least two planetary gears of the planetary gear mechanism have a spur toothing system or a helical toothing system.

10. A wind power plant, comprising:
    a rotor;
    an electric generator; and
    a planetary gear mechanism configured to convert a slow rotational movement of the rotor into a rapid rotational movement to operate the electric generator, the planetary gear mechanism including:
       a drive shaft connected to the rotor;
       an output shaft connected to the electric generator;
       a planetary gear carrier;
       a planetary gear; and
       a bearing arrangement arranged on the planetary gear carrier and configured to rotatably mount the planetary gear, the bearing arrangement including:
          at least two tapered roller bearings arranged spaced apart axially from one another between the planetary gear and the planetary gear carrier, each of the at least two tapered roller bearings having an inner ring and an outer ring;
          a first intermediate ring configured to axially position the at least two tapered roller bearings on the planetary gear carrier, the first intermediate ring arranged on an outer circumferential face of the planetary gear carrier between the two inner rings;

a collar formed on an inner circumferential face of the planetary gear between the two outer rings radially along an inner circumference of the planetary gear, the collar configured to axially secure the planetary gear; and at least one second intermediate ring configured to axially position the at least two tapered roller bearings with respect to one another, the at least one second intermediate ring arranged on the inner circumferential face of the planetary gear, the at least one second intermediate ring having:

an outer circumferential face; and a cutout formed on the outer circumferential face and directed to the collar, the cutout configured to correspond at least to an axial length of the collar.

* * * * *